Patented Mar. 16, 1948

2,437,908

UNITED STATES PATENT OFFICE 2,437,908

PRINTING INKS

Caesar Frank Chiappe, Philadelphia, and John William Kroeger, Drexel Hill Plaza, Pa., assignors to Fred'k H. Levey Co., Incorporated, New York, N. Y., a corporation of New York No Drawing. Application May 22, 1946, Serial No. 671,666

4 Claims. (Cl. 106—30)

This invention relates to quick-drying printing inks and particularly to inks designed to permit rapid drying of printed impressions by application of heat.

Inks have been described previously in which glycols such as propylene glycol, diethylene glycol, dipropylene glycol etc. are used as solvents for various resins to provide suitable vehicles. Such inks all suffer from the defect that, when printed with half-tone plates on long printing runs, they cause specking and "fill-up" due to accumulation of lint and dirt in the spaces between adjacent half-tone dots.

It is the object of the invention to provide improved ink compositions having several advantages over inks as heretofore known as hereinafter set forth.

We have found that inks can be made which do not cause specking, and which retain many of the advantages of the older glycol inks such as smooth laying properties, good dot reproduction and the like; through the use of liquid, aliphatic, dihydric alcohols containing at least five carbon atoms. We prefer liquid, aliphatic, dihydric alcohols containing from five to eight carbon atoms inclusive. Dihydric alcohols containing more than eight carbon atoms have boiling points which are too high for quick drying by heat when such dihydric alcohols are used as solvents in inks. Those dihydric alcohols which contain less than five carbon atoms and also the polyglycols in which each chain contains less than five carbon atoms have been found to produce specking. Examples of suitable dihydric alcohols are the alkane diols, hexandiol-2,5, 2-methyl pentandiol-2,4, heptandiol-2,4 and 2-ethyl hexandiol-1,3. The invention is not, however, limited to the particular examples because other aliphatic, dihydric alcohols, within the limits mentioned with respect to carbon atoms, can be used.

In addition to elimination of specking or "fill-up" the use of the dihydric alcohols described herein has an advantage over glycols of lower carbon chains in that many resins which are insoluble or poorly soluble in the latter group can be used. For example, gum or wood rosin, polymerized rosin, disproportionated rosin, limed and zincated rosins, certain modified phenolic and maleic resins are insoluble or have limited solubility in glycols such as propylene or diethylene glycol but are freely soluble in dihydric alcohols containing five to eight carbon atoms.

An additional advantage which is obtained by use of the dihydric alcohols mentioned above results from their low hygroscopicity as compared to glycols of lower carbon content. Because of this fact, inks made with dihydric alcohols containing five to eight carbon atoms are unaffected or affected to only a slight degree when printed at high relative humidities. On the other hand, inks containing solvents such as propylene glycol or diethylene glycol cannot be printed at high relative humidities or print poorly, since the strongly hygroscopic nature of such glycols causes absorption of atmospheric moisture into the ink film resulting in premature precipitation of the resin.

Suitable varnishes for ink compositions are prepared by dissolving a binder such as a natural or modified natural resin or an artificial resin in an aliphatic dihydric alcohol having from five to eight carbon atoms. Addition of coloring agents to the varnish affords a satisfactory ink. The proportions may vary widely, depending upon the particular ingredients used and the desired viscosity of the finished ink. The following examples are merely illustrative of the applications of the invention which depend primarily upon the use of aliphatic dihydric alcohols containing from five to eight carbon atoms as the solvent.

EXAMPLE I

A varnish was made by heating resin and solvent at 380° F. until a clear solution was obtained and having the following composition.

| | Parts |
|---|---|
| A rosin-maleic adduct (acid number 320) | 50 |
| 2-methyl-pentandiol-2,4 | 50 |
| | 100 |

Using this varnish, inks were made up having the following composition.

Black ink

| | Parts |
|---|---|
| Carbon black (Colour Index No. 1308) | 16.0 |
| Rosin-maleic adduct | 30.4 |
| 2-methyl-pentandiol-2,4 | 53.6 |
| | 100.0 |

Orange ink

| | Parts |
|---|---|
| Red Lake C (barium salt pigment, Colour Index No. 165) | 4.3 |
| Benzidine yellow (dichlorobenzidine coupled with two moles of acetoacetanilid) | 10.1 |
| Rosin-maleic adduct | 38.6 |
| 2-methyl-pentandiol-2,4 | 47.0 |
| | 100.0 |

Films of these inks dried quickly when heated and the inks could be printed at high relative humidities without specking.

Example II

A water-soluble shellac varnish was obtained by heating the following composition at 200° F. until a clear solution was obtained.

| | Parts |
|---|---|
| Bleached shellac | 39.2 |
| Borax | 3.9 |
| 2-methyl-pentandiol-2,4 | 56.9 |

A black ink made from this varnish had the following composition.

| | Parts |
|---|---|
| Peerless carbon black (Color Index No. 1308) | 19.0 |
| Nigrosine WSB (Color Index No. 865) | 3.0 |
| Victoria Blue B (Color Index No. 729) | 0.4 |
| Bleached shellac | 22.6 |
| Borax | 2.2 |
| 2-methyl-pentandiol-2,4 | 52.8 |
| | 100.0 |

Example III

Other varnishes containing 2-methyl-pentandiol-2,4 are the following. Inks were made from them as outlined in the preceding examples, the pigmentation and methods of manufacture being well known to the art.

(a) A resin was made by reacting urea and 37% aqueous formaldehyde in ethyl alcohol solution. By solvent interchange this resin was transferred to 2-methyl-pentandiol-2,4, the final product being a varnish which contained 35% of urea-formaldehyde resin.

(b) A varnish containing 45% unbleached shellac.

(c) A varnish containing 55% limed rosin.

(d) A varnish containing 50% zincated rosin.

(e) A varnish containing 50% polymerized rosin.

(f) A varnish containing 50% disproportionated rosin.

(g) A varnish containing 50% "Vinsol" which is a gasoline-insoluble resin obtained by extracting pine wood with benzol followed by removal of volatile products and gasoline-soluble materials.

(h) Varnishes containing phenolic resins, both modified and 100%, which are soluble in 2-methyl-pentadiol-2,4.

Example IV

Varnishes similar to those described above were made from hexandiol-2,5, proper allowance being made for the comparatively greater viscosity of this solvent. For example, a varnish containing 40% of rosin-maleic adduct is comparable to the varnish of Example I for viscosity and "tack."

Inks made as outlined in previous examples with hexandiol-2,5 as the solvent likewise dried quickly when the films were heated and could be printed at high relative humidities without fill-up.

Example V

Varnishes similar to those described above were made from 2-ethyl-hexandiol-1,3 again allowing for the greater viscosity of the solvent. For example, a varnish containing 45% of zincated rosin was comparable to that of Example 3(d) above. Inks made as outlined in previous examples with 2-ethyl hexandiol-1,3 had the desired properties.

Other suitable solvents are pentandiol-2,4, heptandiol-2,4 and other dihydric alcohols having from 5 to 8 carbon atoms. It is evident that examples can be multiplied indefinitely, however, those cited above will suffice to describe the invention.

We claim:

1. A printing ink consisting essentially of coloring material, a solvent consisting of an alkane diol containing five to eight carbon atoms inclusive and a resinous binder for the coloring material which is soluble in the solvent.

2. A printing ink consisting essentially of coloring material, a solvent consisting of 2-ethyl hexandiol-1,3, and a resinous binder for the coloring material which is soluble in the solvent.

3. A printing ink consisting essentially of coloring material, a solvent consisting of hexadiol-2,5, and a resinous binder for the coloring material which is soluble in the solvent.

4. A printing ink consisting essentially of coloring material, a solvent consisting of 2-methyl pentandiol-2,4, and a resinous binder for the coloring material which is soluble in the solvent.

CAESAR FRANK CHIAPPE.
JOHN WILLIAM KROEGER.

REFERENCES CITED

The following references are of record in the file of this patent:

UNITED STATES PATENTS

| Number | Name | Date |
|---|---|---|
| 2,289,638 | Erickson | July 14, 1942 |
| 2,313,328 | Erickson | Mar. 9, 1943 |
| 2,404,680 | Aneshansel | July 23, 1946 |

Certificate of Correction

Patent No. 2,437,908.  March 16, 1948.

CAESAR FRANK CHIAPPE ET AL.

It is hereby certified that error appears in the printed specification of the above numbered patent requiring correction as follows: Column 1, line 35, before "hexandiol-2,5," insert *pentandiol-2,4,;* and that the said Letters Patent should be read with this correction therein that the same may conform to the record of the case in the Patent Office.

Signed and sealed this 6th day of July, A. D. 1948.

[SEAL]

THOMAS F. MURPHY,
*Assistant Commissioner of Patents.*